Nov. 25, 1969 D. D. HERSHBERGER 3,480,812
SIGNAL GENERATING DEVICE FOR USE IN CONJUNCTION WITH A
DYNAMOELECTRIC MACHINE AND THE LIKE
Filed Aug. 17, 1967 2 Sheets-Sheet 1
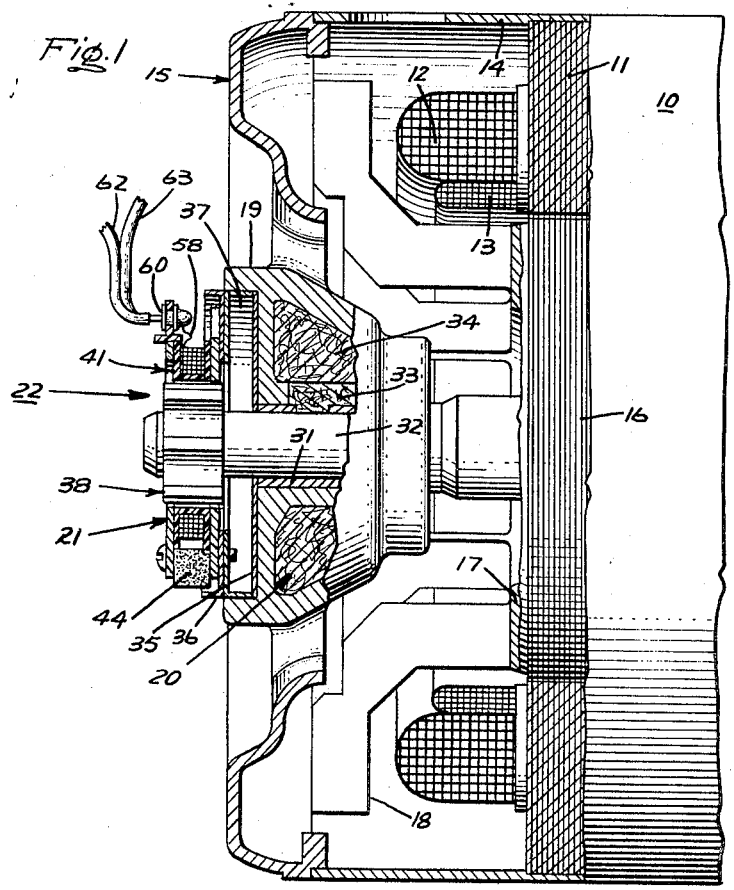
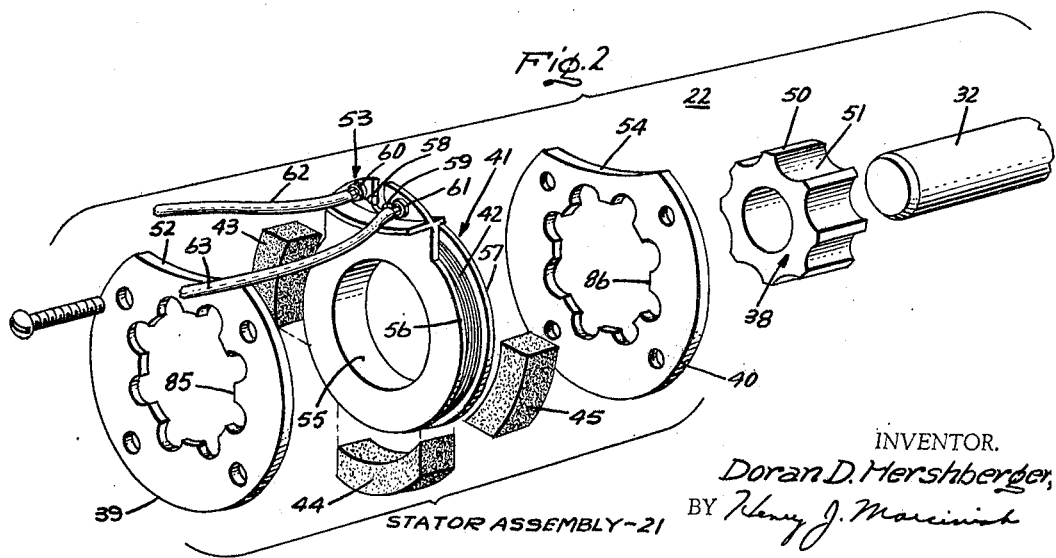
INVENTOR.
Doran D. Hershberger,
BY *Henry J. Marciniak*
Attorney.

Nov. 25, 1969   D. D. HERSHBERGER   3,480,812
SIGNAL GENERATING DEVICE FOR USE IN CONJUNCTION WITH A
DYNAMOELECTRIC MACHINE AND THE LIKE
Filed Aug. 17, 1967   2 Sheets-Sheet 2
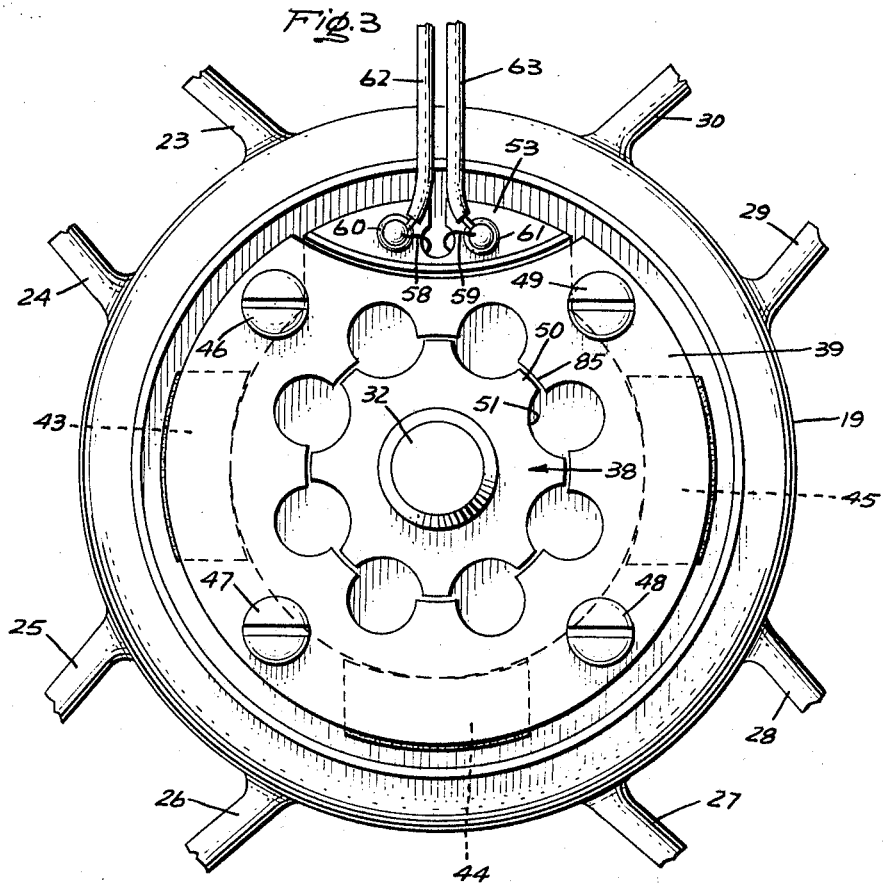
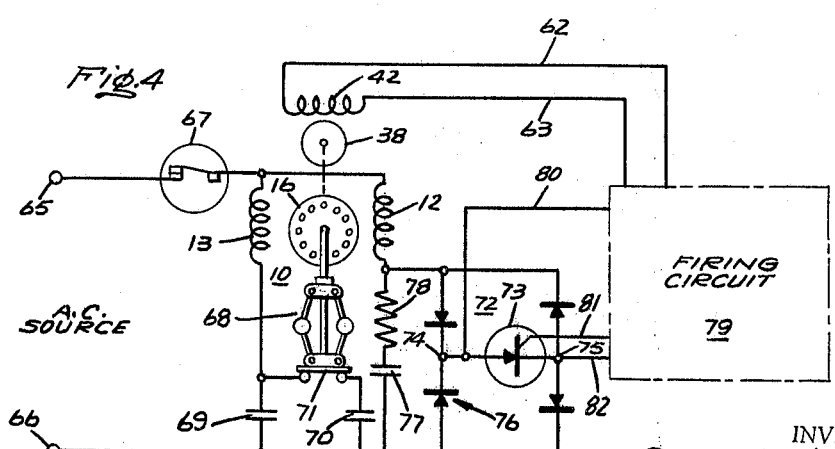
INVENTOR.
Doran D. Hershberger,
BY Henry J. Marciniak
Attorney.

United States Patent Office 3,480,812
Patented Nov. 25, 1969

3,480,812
SIGNAL GENERATING DEVICE FOR USE IN CONJUNCTION WITH A DYNAMOELECTRIC MACHINE AND THE LIKE
Doran D. Hershberger, Sycamore, Ill., assignor to General Electric Company, a corporation of New York
Filed Aug. 17, 1967, Ser. No. 661,277
Int. Cl. H02k 17/44, 21/00
U.S. Cl. 310—168                      5 Claims

ABSTRACT OF THE DISCLOSURE

A device develops a signal indicative of the angular velocity of a rotating shaft of a machine. The device includes a pair of plate-like stator core members with circumferentially spaced and radially extending teeth that define a rotor-receiving opening, a coil assembly with a bobbin having a coil-receiving opening and a resilient permanent magnet for establishing magnetic flux. The coil assembly and the resilient permanent magnet are sandwiched between the stator core members, the stator assembly being attached to the machine so that a toothed rotor carried on the rotating shaft is positioned within the rotor-receiving openings of the stator core members and the coil assembly. Rotation of the rotor relative to the fixed stator core members introduces a variable magnetic reluctance into the magnetic flux path thereby to produce an alternating current signal in said pickup coil having an amplitude and frequency that varies with the angular velocity of the shaft.

BACKGROUND OF THE INVENTION

This invention relates to signal generating devices and more particularly to speed signal generating devices adapted for mounting on the frame of a machine such as a dynamoelectric machine to provide an electrical signal indicative of the angular velocity of a rotating member such as a shaft.

In recent years there has been an increasing number of applications where a feedback signal indicative of the shaft angular velocity of a machine, such as an electric motor, is required in an automatic control system to perform such functions as closed-loop stabilization, speed computation, and others. In certain automatic control systems, it is desirable to achieve regulation of the angular velocity of a driving motor over a wide range of speeds. For example, control systems are finding increasing use in conjunction with the variable speed squirrel cage motors used in automatic washers to provide the speeds required to permit the automatic washer to handle garments that formerly required hand washing and to handle normal wash loads. Such a control system must maintain a constant speed over a wide range of load variations to provide the desired uniform washing action.

There is a need, therefore, for a signal generating device that can be readily mounted on the frame of the electric motor to produce a signal indicative of the angular velocity of the motor shaft. The signal generating device should be of relatively simple construction, capable of being easily manufactured on a mass production basis and should be quickly assembled and disassembled from the motor. Additionally, in appliance applications where space requirements are critical, it is particularly desirable that when the signal generating device is mounted on the motor frame that it does not appreciably add to the overall axial length of the motor.

Accordingly, it is a general object of my invention to provide an improved signal generating device for use in conjunction with machines such as electric motors to produce an electrical signal indicative of the angular velocity of a shaft.

Another object of my invention is to provide an improved signal generating device utilizing a relatively few number of parts and of relatively simple construction.

It is still a further object of the present invention to provide an improved signal generating device characterized by relatively small axial dimensions relative to the radial dimensions thereof so that when the device is mounted on a frame of the machine, the device will not substantially increase the axial dimensions thereof.

A more specific object of the present invention is to provide an improved signal generating device capable of being readily assembled and disassembled from the frame of the machine on which the signal generating device is mounted.

SUMMARY OF THE INVENTION

In carrying out the objects of my invention in one form, I provide a signal generating device for producing an electrical signal indicative of the angular velocity of a shaft and for use in conjunction with a machine having a frame supporting one end of the shaft for rotation about an axis. The signal generating device is comprised of a stator assembly for attachment to the frame and a toothed rotor for attachment in the shaft or integrally formed on the shaft.

The stator assembly includes at least one plate-like stator core member having radially extending and circumferentially spaced teeth defining a rotor-receiving opening. It also includes a pickup coil disposed in circumscribing relation with respect to the axis of rotation of the shaft, a means for insulating the pickup coil from at least the stator core member and a means for producing magnetic flux through the stator core member and linking the pickup coil. When the teeth on the rotor are angularly displaced relative to the teeth on the stator core member, the magnetic reluctance in the path of the magnetic flux varies thereby changing the magnetic flux linking the pickup coil and inducing in the pickup coil an alternating signal having an amplitude and frequency that varies with the angular velocity of the shaft of the machine.

According to more specific aspects of my invention, the stator assembly may include a pair of plate-like stator core members with at least the pickup coil and the means for producing magnetic flux being sandwiched between the stator core members. The means for insulating the pickup coil is preferably a bobbin formed of insulating material with an essentially circular opening for receiving the rotor and with a pair of radially extending rims for containing the pickup coil. Preferably, the means for producing the magnetic flux is formed of a resilient permanent magnetic material such as a ferromagnetic ceramic bonded in rubber and the bobbin is formed of a polymeric amide.

An important advantage of the improved signal generating device when applied to a dynamoelectric machine, such as an electric motor, is that it can be attached to the end shield of the motor without an appreciable increase in the actual dimensions of the motor. The magnet and pickup coil are not rotated during operation, and the signal generating device utilizes relatively few parts that are easy to assemble and reliable in operation.

The subject matter which I regard as my invention is set forth in the appended claims. The invention itself, however, together with further objects and advantages thereof may be understood by referring to the following description taken in conjunction with the accompanying drawings.

BRIEF DESCRIPTION OF THE DRAWINGS

FIGURE 1 is a side elevational view, partly in section, of one end of a dynamoelectric machine utilizing the improved signal generating device constructed in accordance with the preferred embodiment of the present invention;

FIGURE 2 is an exploded view in perspective illustrating the various parts of the signal generating device shown in FIGURES 1 and 3;

FIGURE 3 is an enlarged end view of the signal generating device mounted in the dynamoelectric machine end frame, only a portion of which is shown; and FIGURE 4 is a schematic circuit diagram of the dynamoelectric machine and control system utilizing the speed-generating device.

DESCRIPTION OF THE PREFERRED EMBODIMENT

Referring now to the drawings in more detail and more specifically to FIGURES 1, 2 and 3, I have shown the invention embodied in a single phase induction motor 10 of the fractional horsepower type. The motor 10 has a stator 11 of standard construction with a main field winding 12 and starting winding 13 placed in slots formed in the stator 11. The stator 11 is encased by a frame formed by cylindrical shell 14 and end shield members 15, only one of which is shown in the view of FIGURE 1. The end shield member 15 is attached to the cylindrical shell 14 by welding or other suitable securing means.

During operation of the motor 10, the main field winding 12 and starting winding 13 cause currents to be induced in a squirrel cage winding arranged in slots of an armature 16 having an end ring 17. Attached to the end ring 17 of a squirrel cage winding (not shown) are fan blades 18 circulating ventilating air to the motor 10.

Having more specific reference now to the end shield member 15 as shown in FIGURES 1 and 3, it will be seen that the end shield member 15 is formed with a central hub portion 19 that is adapted for housing the bearing and lubrication assembly 20 and for supporting a stator assembly 21 of a signal generating device 22 embodying one form of my invention. As is best seen in FIGURE 3, the central hub portion 19 is supported from the outer portion of the end shield member 15 by struts 23, 24, 25, 26, 27, 28, 29 and 30 which form passages for the circulation of air through the motor 10. The bearing and lubrication assembly 20 includes a bearing 31 carried by the end shield member 15 for rotatably supporting a shaft 32, an oil wick 33 for supplying to the bearing 31, and packing 34 for storing oil. A spring washer 35 serves to lock in the components of the bearing and lubrication assembly 20 within the central hub portion 19 and cooperates with the inwardly extending portion of a double end cap 36 to define a lubricant return chamber 37.

Referring now to FIGURES 1 and 3 and more specifically to the exploded view of FIGURE 2, I will now describe more fully the various parts of the signal generating device 22. This device is essentially comprised of a stator assembly 21 and a rotor 38. The stator assembly 21 includes a pair of plate-like stator core members 39 and 40, a bobbin 41, a pickup coil 42 and permanent magnets 43, 44, and 45. Four screws 47, 48, 49 and 50 which are threaded into the end cap 36 hold the stator assembly 21 of the signal generating device 22 in assembled relation and cause the permanent magnets 43, 44 and 45, the bobbin 41 and pickup coil 42 to be sandwiched between the stator core members 39 and 40.

In the exemplification of the invention, the rotor 38 is fabricated of sintered iron and includes a plurality of axially extending and circumferentially spaced rotor teeth 50 and arcuate slots 51. As illustrated, the rotor teeth 50 are equally spaced, and a total of eight teeth were used in the illustrative embodiment of the invention. Although in the exemplification of my invention, the rotor 38 was attached to the shaft 32 by a press fit, it will be appreciated that the rotor 38 may be attached to the shaft 32 by other suitable means and that the rotor 38 may be fabricated as an integral part of the shaft 32.

As is best seen in FIGURE 2, the outer plate-like stator core member 39 is preferably formed with a cutaway side 52 for receiving the terminal projection 53 of the coil bobbin 41. It will be apparent that although the inner plate-like stator core member 40 is also formed with a cutaway side 54, this is done to make these two parts interchangeable and is not, of course, required. Likewise, it will be appreciated that although two stator core members 39 and 40 punched from a relatively thick sheet of magnetic material are used in the stator assembly 21, a single stator core member may be used and a stack of laminations may be employed to form an individual stator core member.

Referring back to FIGURE 2, it will be seen that the bobbin 41 has an essentially circular opening 55 for receiving the rotor 38. Also, the bobbin 41 with a pair of radially extending rims 56 and 57 for containing the pickup coil 42. In the exemplification of the invention, the outer edge of the rims 56 and 57 served to position the permanent magnets 43, 44 and 45. Leads 58 and 59 of the pickup coil 42 are brought out to eyelets 60, 61 of terminal projection 53 to which external leads 62, 63 are soldered. Preferably, the bobbin 41 is fabricated from a polymeric amide or other similar resin insulating material.

In the illustrated exemplification of my invention, resilient permanent magnets 43, 44 and 45 are used so that the magnets are compressively engaged between the two stator core members 39 and 40 when attached to the end shield member 15. In the actual practice of the invention, the permanent magnets 43, 44 and 45 were cut from strips of barium ferrite bonded with rubber. The thickness of a strip was slightly greater than the axial dimension of the bobbin 41 so that when the stator core members 39 and 40, the bobbin 41 and magnets 43, 44 and 45 are assembled on the end shield member 15, the magnets 43, 44 and 45 are initially compressed before the bobbin 41 is sandwiched between the stator core members 39 and 40. The resiliency of the magnets 43, 44 and 45 permits them to be shaped to more or less conform generally with the circular configuration of the stator core members 39 and 40.

It will be understood that other permanent-type magnet materials such as the tungsten magnet steels, cobalt-chromium steels, iron-aluminum alloys, bismuth-manganese alloys, cobalt-platinum alloys, and ferromagnetic ceramics and ferrites can be used. Although in the illustrated embodiment of my invention, three permanent magnets 43, 44 and 45 were used, it will be apparent that this was done primarily to accommodate the screws 46, 47, 48 and 49 and that one magnet wrapped around the bobbin 41 could have been used.

Having reference now to the schematic diagram shown in FIGURE 4, I will now describe an application of the motor 10 utilizing the improved signal generating device 22. It will be seen that the input terminals 65, 66 are provided for connection to a suitable alternating current source. A thermal protector 67 connected in circuit with the input terminal 65 and positioned adjacent to the windings 12, 13 disconnects the motor 10 from the line in the event that the windings overheat.

As illustrated in FIGURE 4, a centrifugal mechanism 68 is shown in the start condition with the run capacitor 69 and the start capacitor 70 connected in the starting winding circuit by switch 71. It will be understood that when the motor 10 reaches a preselected speed, the switch 71 opens to disconnect the start capacitor 70 from the motor circuit. The main winding 12 is connected across the input terminals 65, 66 through a bilateral solid state switch 72 consisting of a silicon controlled rectifier 73 connected within the D.C. terminals 74, 75 of a full-wave bridge 76.

A capacitor 77 and resistor 78 are connected across the controlled rectifier 73 to aid in the suppression of transients and to insure that the controlled rectifier 73 turns off at the end of each half cycle of the alternating supply. A firing circuit 79, which may be of any conventional type, such as a ramp and pedestal unijunction oscillator, is coupled by leads 80, 81 and 82 to the controlled rectifier 73. The conduction angle of the silicon controlled rectifier 73 is varied in response to the changes of the feedback signal from the speed signal generating device 22 for the purpose of regulating the speed.

During operation, the signal generating device 22 essentially functions as a variable reluctance generator, and the amplitude and frequency at the output leads 62 and 63 vary with the velocity of the motor shaft. It will be appreciated that when the teeth 50 of the rotor 38 and the teeth 85, 86 of the stator core members 39, 40 are in the position of alignment as shown in FIGURE 3, the reluctance in the path of the magnetic flux is at a minimum. However, as the rotor 38 is angularly displaced 22½ degrees from this position to a position where the teeth 50 of the rotor 38 and the teeth 85, 86 of the stator core members 39, 40 are aligned with the center line of the slots, the reluctance in the magnetic flux path is at a maximum. Thus, as the rotor 38, rotates, a varying reluctance is introduced in the path of the magnetic flux. As a result, the magnetic flux linking the pickup coil 42 changes, and the pickup coil 42 has induced therein an alternating signal whose frequency and amplitude will vary with the speed of the motor shaft 32. Although in the illustrated application of the invention, the amplitude of this signal was used as a reference in the firing circuit 79, it will be appreciated that the frequency of this signal can also be used as a reference for regulating the speed of the motor 10.

An important advantage of the improved signal generating device arrangement is that it is reliable in operation and utilizes relatively few number of parts that can be inexpensively manufactured. Also, it is readily adapted for attachment to a motor or other machine having a rotating shaft where it is desirable to provide a voltage signal indicative of the speed of rotation of the shaft. In applications where the axial dimensions of the machine must be kept within certain prescribed limits, as is the case generally in appliance motor applications, the improved speed signal generating device can be attached to the end frame so that the mounting of the device does not provide any objectionable increase in the overall axial dimensions of the machine. Although the speed signal generating device in the exemplification of my invention was mounted on the exterior of the frame, it will be apparent that it can be mounted within the interior of the machine where it is desirable to do so.

From the foregoing description of the particular embodiment of my invention, it will be apparent that many modifications may be made thereto. For example, it will be apparent to those skilled in the art that the number of permanent magnets, the number and shape of the teeth on the stator core members and the rotor, and the configuration of the bobbin may be varied. Accordingly, it will be understood that the embodiment described herein is intended as an illustrative example of the invention, and that the invention is not limited thereto. It is intended, therefore, by the appended claims to cover all such modifications that fall within the true spirit and scope of the invention.

What I claim as new and desire to secure by Letters Patent of the United States is:

1. In a dynamoelectric machine having a frame rotatably supporting one end of a shaft, the improvement comprising: a pair of plate-like stator core members having radially extending and circumferentially spaced teeth defining a rotor-receiving opening, a rotor on the shaft, said rotor having circumferentially spaced and radially extending teeth, a pickup coil assembly including a bobbin of insulating material with a rotor-receiving opening and also including a pickup coil wound on the bobbin, said bobbin including a wall extending axially therefrom, at least one of said plate-like stator core members having a peripheral segment with a shape complementary to said wall; at least one permanent magnet for producing magnetic flux, and means for attaching said plate-like stator core members, said coil assembly, and said at least one permanent magnet in assembled relation with respect to the frame of the dynamoelectric machine and with said peripheral segment of said one plate-like stator core member in juxtaposition to said wall of said bobbin whereby said rotor is positioned within said rotor-receiving openings of said stator core members and said bobbin, said at least one permanent magnet and said coil assembly being sandwiched between said plate-like stator core members, and said teeth on said rotor when angularly displaced relative to said teeth on said stator members providing a variable magnetic reluctance in the path of the magnetic flux thereby changing the magnetic flux linking said pickup coil and inducing therein an alternating electric signal having an amplitude and frequency that varies with the angular velocity of said shaft of said dynamoelectric machine.

2. In the dynamoelectric machine set forth in claim 1 wherein: said bobbin is formed of a polymeric amide with an essentially circular shaped rotor-receiving opening and a pair of radially extending rims for containing said pickup coil and positioning said at least one permanent magnet; one of said rims having a radial projection, connection means supported on said projection for connecting said pickup coil to external leads; said axially extending wall projecting from said one of said rims radially inwardly of said connection means.

3. In the dynamoelectric machine set forth in claim 1 wherein: said bobbin is formed with an essentially circular rotor-receiving opening and a pair of radially extending rims for containing said pickup coil; said rims having corresponding, generally arcuate outer edge sections axially spaced apart a predetermined distance; said at least one permanent magnet having a generally arcuate inner surface complementary to said outer edge sections and of a width at least slightly greater than the axial distance between said outer edge sections for positioning said at least one permanent magnet in juxtaposition to said outer edge sections.

4. In a dynamoelectric machine: a frame supporting one end of a shaft for rotation about an axis; a signal generating device comprising at least one stator core member having radially extending and circumferentially spaced teeth defining an opening, a plurality of teeth on said shaft extending radially therefrom to provide a path of low magnetic reluctance when aligned with the teeth radially extending from said stator member; a pickup coil disposed in circumscribing relationship with respect to the axis of rotation of said shaft; at least one resilient permanent magnet for producing magnetic flux through said at least one stator core member and linking said pickup coil; means for insulating said pickup coil from said at least one stator core member comprised of a bobbin formed of insulating material with an essentially circular opening for receiving said teeth on said shaft and a pair of radially extending rims for containing said pickup coil and positioning said at least one permanent magnet; one of said rims having a radial projection, connection means supported on said projection for connecting said pickup coil to external leads, said one of said rims including a wall extending axially therefrom radially inward of said connection means, said at least one stator core member having a peripheral segment with a shape complementary to and in juxtaposition to said wall; a bearing assembly fixedly supported on said frame and rotatably supporting said shaft, said bearing assembly including an end cap mounted in fixed relationship to said frame; and means for maintaining said at least one stator core member, said at least one resilient permanent magnet and said pickup coil in fixed relationship and fixedly attached to said end cap; whereby said teeth on said shaft are disposed within the opening formed in said at least one stator core member, and said teeth on said shaft, when angularly displaced relative to said teeth of said at least one stator core member provide a variable magnetic reluctance in the path of magnetic flux thereby changing the magnetic flux linking said pickup coil and inducing therein an alternating signal that varies with the angular velocity of said shaft of said dynamoelectric machine.

5. In a dynamoelectric machine: a frame supporting one end of a shaft for rotation about an axis; a signal generating device comprising at least one stator core member having radially extending and circumferentially spaced teeth defining an opening, a plurality of teeth on said shaft extending radially therefrom to provide a path of low magnetic reluctance when aligned with the teeth radially extending from said stator member; a pickup coil disposed in circumscribing relationship with respect to the axis of rotation of said shaft; means for insulating said pickup coil from said at least one stator core member comprised of a bobbin formed of insulating material with an essentially circular opening for receiving said teeth on said shaft and a pair of radially extending rims for containing said pickup coil, said rims having corresponding, generally arcuate outer edge sections axially spaced apart a predetermined distance; means for producing magnetic flux through said at least one core member and linking said pickup coil comprised of at least one permanent magnet having a generally arcuate inner surface complementary to said outer edge sections and of a width at least slightly greater than the axial distance between said outer edge sections for positioning said at least one magnet in juxtaposition to said outer edge sections; said bobbin further including an axially extending wall projecting from said one of said rims; said at least one stator core member having a peripheral segment with a shape complementary to and in juxtaposition to said wall; a bearing assembly fixedly supported on said frame and rotatably supporting said shaft, said bearing assembly including an end cap mounted in fixed relationship to said frame; and means for maintaining said at least one stator core member, said means for producing magnetic flux and said pickup coil in fixed relationship and fixedly attached to said end cap whereby said teeth on the shaft of the dynamoelectric machine are disposed within the opening formed in said at least one stator core member, and said teeth on said shaft when angularly displaced relative to said teeth on said at least one stator core member provide a variable magnetic reluctance in the path of the magnetic flux thereby changing the magnetic flux linking said pickup coil and inducing therein an alternating signal that varies with the angular velocity of the shaft of said dynamoelectric machine.

References Cited

UNITED STATES PATENTS

| 3,134,918 | 5/1964 | Eichenberger et al. | 310—168 |
| 3,198,973 | 8/1965 | Short et al. | 310—168 |
| 3,198,974 | 8/1965 | Ousenberry et al. | 310—168 |
| 3,213,303 | 10/1965 | Riley et al. | 310—154 |
| 3,267,399 | 8/1966 | Spieker et al. | 310—168 |
| 3,339,097 | 8/1967 | Dunn | 310—194 |

MILTON O. HIRSHFIELD, Primary Examiner

G. P. TOLIN, Assistant Examiner

U.S. Cl. X.R.

310—154, 194